United States Patent Office 3,495,459
Patented Feb. 17, 1970

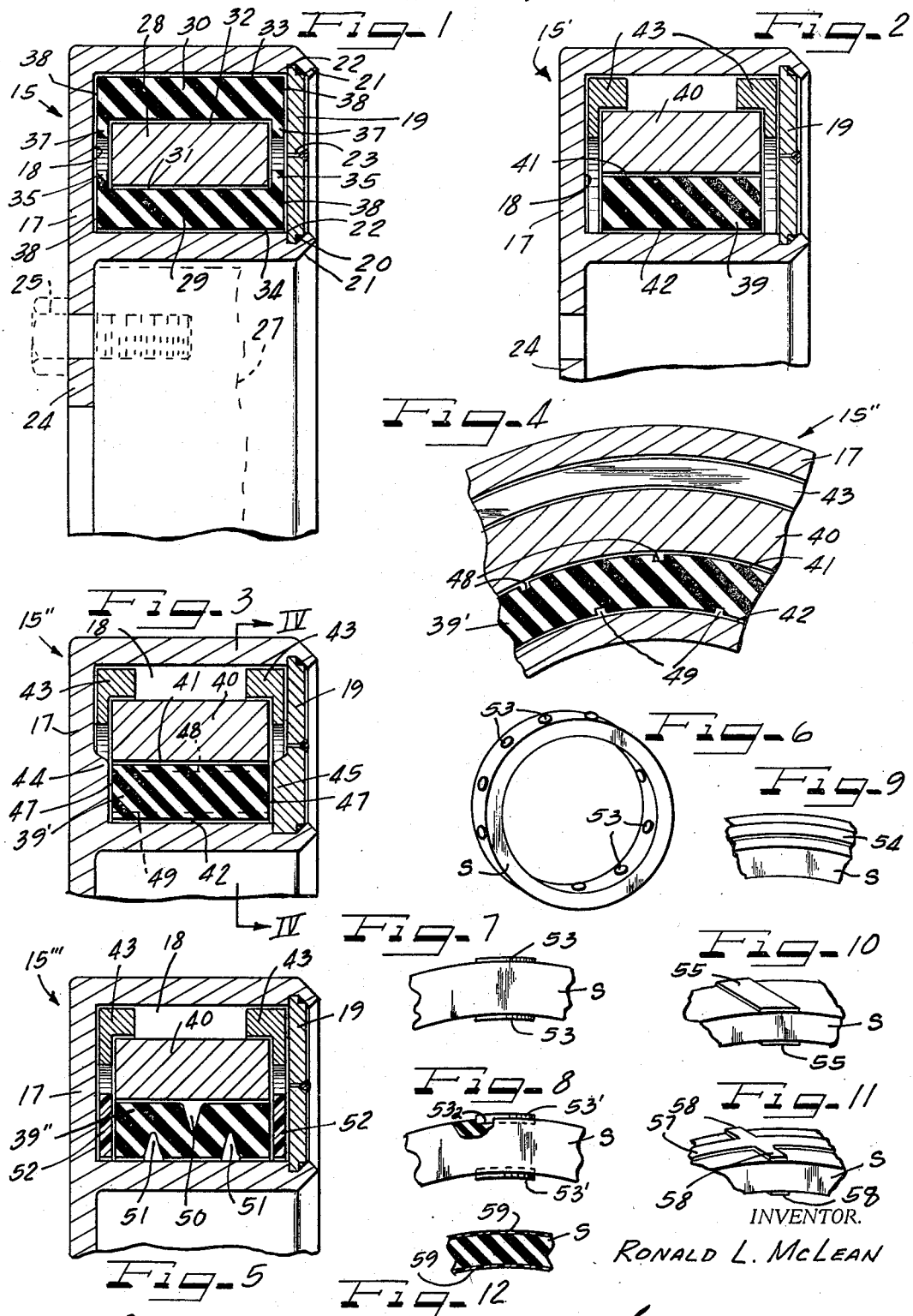

3,495,459
TUNED VISCOUS DAMPERS
Ronald L. McLean, Tonawanda, N.Y., assignor to
Houdaille Industries, Inc., a corporation of Delaware
Filed Dec. 29, 1967, Ser. No. 694,513
Int. Cl. F16f 15/12
U.S. Cl. 74—574                                    16 Claims

ABSTRACT OF THE DISCLOSURE

A tuned vibration damper has a housing defining a sealed working chamber and arranged to be attached to a structure such as a rotary shaft subject to vibrations to be damped. An inertia mass and one or more elastic tuning springs are connected in series to one another and to the housing within the chamber by coupling means comprising at least one viscous shear damping film.

---

This invention relates to a new and improved tuned viscous damper construction and is especially suitable for torsional vibration dampers of the type adapted to be attached to rotary shafts subjects to vibrations to be damped.

It has heretofore been proposed to tune viscous dampers by the provision of a bonded elastomeric spring, that is, the tuning spring and the inertia mass operate in parallel with the damping coupling. Representative of the prior art along this line is Patent No. 2,636,399. Since silicone fluid is the usual viscous damping medium in such a damper, the elastomer-metal bond may be vulnerable to silicone fluid attack. Efficiency of the viscous damping is limited by the reduction in shear film area. Further, in the parallel relationship both the spring and the inertia mass must take the full angular windup to satisfy a desired operating condition at resonance.

An important object of the present invention is to overcome the foregoing and other deficiencies and shortcomings of prior art arrangements and to provide for improved combination elastomeric spring and viscous shear damping in a new and improved manner.

Another object of the present invention is to provide a new tuned vibration damper construction utilizing viscous shear damping and elastomeric spring tuning.

A further object of the invention is to provide a novel tuned viscous shear damper embodying an unbonded elastomeric spring for tuning.

Still another object of the invention is to provide a novel tuned damper construction employing a series combination of elasticity and viscous shear damping reducing the working amplitudes across both the elastomeric spring and the shear film as compared to prior constructions and promoting great life in the elastomer and the viscous fluid.

Yet another object of the invention is to provide a new and improved tuned damper having improved temperature compensation characteristics.

A still further object of the invention is to provide a new and improved tuned viscous shear damper utilizing an elastomeric spring which functions as a positioning resilient bearing for the inertia mass.

A yet further object of the invention is to provide a novel vibration damper affording substantial economies in construction in that tolerance requirements can be enlarged, and less attention need be paid to internal finishes; plating and sealing and impregnating of the inertia mass can be eliminated; metal bearings need not be used; and the like.

Others objects, features and advantages of the present invention will be readily apparent from the following detailed description of certain preferred embodiments thereof taken in conjunction with the accompanying drawing, in which:

FIGURE 1 is a fragmentary radial sectional detail view through a torsional vibration damper embodying features of the invention.

FIGURE 2 is a similar view showing a modification.

FIGURE 3 is a similar view showing a further modification.

FIGURE 4 is a sectional detail view taken substantially along the line IV—IV of FIGURE 3.

FIGURE 5 is a radial sectional detail view to still another modification.

FIGURE 6 is an isometric view of an annular elastomeric spring adapted for use in a torsional viscous shear damper according to any of the forms of FIGURES 1–5, for example.

FIGURE 7 is an enlarged fragmentary side elevational view of the elastomeric spring member of FIGURE 6; and FIGURES 8 to 12, inclusive, disclose respective modifications of the elastomeric spring member.

By way of example, in FIGURE 1 a viscous shear damper 15 of the torsional type is depicted comprising relatively movable members, one of which provides an annular housing 17 which is desirably constructed with minimum of seams or joints, and preferably as a casting, providing an annular working chamber 18 of generally rectangular transverse cross section opening from one side. An annular closure plate 19 over the open side of the chamber is hermetically sealed by respective annular static seals 20 under compression by rolled over retaining flanges 21 clamping the respective margins of the plate against shoulders 22 on the housing.

Viscous damping fluid such as a suitable grade and viscosity of silicone is filled into the working chamber 18 through one or more filler openings 23 in the closure plate 19 and hermetically sealed as by welding. Attaching means such as a radially inward integral flange 24 on the housing 17 is adapted to be secured fixedly in suitable manner as by means of bolts 25 to a structure such as a rotary shaft 27 subject to vibrations requiring damping.

Series tuned viscous damping is accomplished by providing within the working chamber 18 an inertia mass 28 and one or more, herein two, elastic springs 29 and 30, and more particularly, elastomeric springs, coupled by means comprising at least one viscous shear damping film, between the inertia mass and the respective springs or between the springs and the housing, but desirably between both the inertia mass and the housing and the springs. To this end, the inertia mass 28 is in the form of a flywheel ring of rectangular transverse cross section and of suitably differential inside and outside diameter to accommodate the tuning spring 29 of complementary ring shape concentrically between it and the radially inner wall defining the chamber 18, and to accommodate the tuning spring 30, of complementary ring shape concentrically between the outer diameter of the inertia ring and the radially outer wall defining the chamber 18. Both of the tuning springs 29 and 30 desirably have between the confronting surfaces of the housing and of the inertia ring respective viscous shear film damping couplings. A viscous shear damping film coupling exists where a space between two relatively movable members is such that the relative movements are resisted by the fluid in shear rather than a mere drag or lubricating film relationship. This viscous shear damping fluid relationship has become well known in the art through Patent 2,514,136. Between the inertia ring member 28 and the spring member 29 oppositely radially facing annular surfaces provide a viscous shear film gap 31. Between the inertia ring member and the spring member 30 the confronting oppositely radially facing surfaces provide a viscous shear damping gap 32. Preferably, there is also a viscous shear damping film gap 33 between the confronting oppositely radially facing surfaces of the spring ring member 30 and the contiguous wall of the housing 17. Between the confronting oppositely radially facing surfaces of the housing 17 and the spring ring member 29 a viscous shear damping film gap 34 is provided. Through this arrangement, not only is viscous damping provided between the housing and the inertia mass ring 28, but tuning is provided in respect to at least two nodes by the respective elastomeric spring members 29 and 30 as a function of the elasticity of the material of the springs.

In addition to their elastic tuning capability, the spring members 29 and 30 function as separators or bearings between the inertia mass 28 and the surfaces of the housing 17 within the working chamber 18, enabling the use of metal materials in the inertia mass and the housing which may be subject to at least galling and possibly sticking in the presence of the silicone coupling fluid on direct contact with one another, as is known in respect to ferrous materials. Axial displacement of the inertia member 28 toward the axially facing housing wall surfaces is prevented by means comprising spacer flange means on at least one of the spring members 29 and 30, and in FIGURE 1 shown as a radially outwardly extending flange structure 35 at each respective end portion of the spring ring 29 projecting into interposed relation between the respective adjacent end of the inertia ring member 28 and the adjacent axially facing wall surface of the housing. On the spring ring member 30 radially inwardly extending respective end flanges 37 project between the respective ends of the inertia ring member 28 and the axially facing housing walls, for the same purpose. It may also be noted that the flanges 35 and 37 increase the areas of the respective ends of the elatsomeric spring members 29 and 30 and thus improve the efficiency of viscous shear film gaps 38 between the respective spring member ends and the confronting wall surfaces of the housing. By having the flanges 35 and 37 spaced from one another, and gaps between all surfaces of the inertia ring 28 and the elastomeric spring rings 29 and 30 and between the spring rings and all confronting surfaces of the housing thorough distribution of viscous fluid throughout the working chamber 18 and into all of the shear film viscous coupling gaps is assured.

During normal co-rotational movement of the damper 15 with the shaft 27, the viscous couplings between the inertia member 28, the elastomeric springs 29 and 30 and the housing 17 tend to effect corotational movement of the inertia member, the springs and the housing. In the presence of torsional vibrations of the shaft 27 and the housing 17 fixedly coupled thereto, the inertia ring 28 tends to rotate uninterruptedly and to carry the elastomeric springs 29 and 30 with it by reason of the viscous couplings in the gaps 31 and 32. However, the springs 29 and 30 are viscously coupled to the housing by the viscous couplings in the gaps 33, 34 and 38 which afford a larger coupling area than the coupling areas between the springs and the inertia mass so that the springs tend to vibrate torsionally with the housing 17. As a result, there is a series damping effect by energy absorption of the viscous fluid in the several shear film gaps. Further, because of their elasticity, the springs 29 and 30 afford elastic damping in addition to resistance to vibratory movements afforded by the viscous shear films between the inertia member and the springs and between the springs and the housing, and numerous and varied combinations of viscous shear damping and elastic tuning response may be secured by suitable variations in the several parameters of relative mass, proportions and spring durometers in the inertia mass and the elastic springs and the area ratios involved in the viscous shear film surface confrontations, to meet numerous and varied operating conditions. In the series combination relationship of the viscous shear films and the elastic springs, the total windup across the series elements is in inverse relation to the individual stiffness of the elements.

An elastomer should be chosen for the respective springs 29 and 30 which will suit the operational requirements. Suitable are synthetic rubber such as nitrile butadiene, ethylene-propylene, fluorosilicone or fluorocarbon. By virtue of the hermetically sealed enclosure of the springs within the working chamber full protection against deterioration due to oxidation and other chemical attack is afforded. The series combination of elasticity and damping reduces the working amplitudes across both the elastomeric springs and the fluid film, promoting greater life in the elastomer and the damping fluid because any given relative motion is split up between the spring and the inertia mass so that both elements are subjected to smaller displacements than in a parallel damper relationship, such smaller displacements, added together, making up the given relative motion. In addition, the spring elements permit unimpaired functioning of the damper unit even where the casing of the housing may become dented during service or in handling inasmuch as the elastomeric elements are sufficiently yieldable to avoid binding.

An advantageous feature attained with the present damper is that temperature compensation of damping coefficient. By properly selected thermal coefficient of expansion of the elastomeric spring elements relative to the housing and the inertia mass, the viscous shear film gaps enlarge at reduced temperatures due to relative elastomer shrinkage, while at higher temperatures the viscous shear film gaps become proportionately constricted due to relative elastomer expansion. By the proper relation of elastomeric spring coefficient of expansion to viscosity changes of the damping fluid highly efficient, uniform damping results are thus attainable.

In FIGURE 2 a damper 15' is shown in which the housing 17 is substantially the same as described in relation to the damper 15 of FIGURE 1, as is also the annular working chamber 18. In this modified damper, however, a single elastomeric annular tuning spring ring 39 is provided within an annular inertia member 40 and with a viscous shear film coupling gap 41 therebetween. In this instance the spring ring 39 is of greater thickness than the spring ring 29 of FIGURE 1 and thus capable of greater elastic tuning torsional movement for any given suitable durometer. Between the spring ring 39 and the confronting annular surface within the working chamber 18 is a viscous shear film coupling gap 42. Substantially viscous fluid reservoir gaps are afforded between the ends of the ring members and the axially facing surfaces defining the working chamber 18, as well as between the outer perimeter of the inertia ring 40 and the confronting wall of the working chamber. A centered relationship of the inertia ring 40 is maintained by respective rabbet groove ring bearings 43 received in the outside corners of the working chamber 18 and receiving the outside corner positions of the inertia ring. These bearing rings 43 are of a material compatible with the silicone damping fluid, and retain the inertia ring member substantially concentric within the working chamber and against any substantial eccentric displacement.

In a modification of the series tuned damper of FIGURE 2, a damper 15" of FIGURE 3 includes annular pads 44 and 45 on respectively the axially facing wall surfaces within the working chamber 18 on the housing 17 and the closure disk 19 to maintain the spring ring 39' substantially centered and to afford respective viscous shear film coupling gaps 47 between the centering pads and the ends of the spring ring and supplemental to the gap 42, thus increasing the shear film coupling of the spring ring to be greater than the coupling afforded by the gap 41 between the inertia mass 40 and the spring ring. In addition, in order to accommodate temperature extremes and avoid too thin or lack of coupling fluid at the inertia mass-spring and the spring-housing interfaces due to temperature rise, or excessively widen gaps due to temperature drop, a series of circumferentially spaced transverse grooves 48 of limited depths are provided on the outer perimeter of the spring ring 39' (FIG. 4) and similar transverse grooves 49 are provided in the inner perimeter of the ring, and staggered with respect to the grooves 48. Nevertheless, desirable gap changes responsive to temperature differentials will afford temperature compensation of torsional damping coefficient, as is desirable.

In another arrangement, as shown in the damper 15''' in FIGURE 5, the elastomeric spring member 39'' is provided with annular circumferentially extending respective outer perimeter and inner perimeter grooves 51 in staggered relation. While only one of the grooves 50 is shown in the outer perimeter and two of the grooves 51 in the inner perimeter, this relationship may be reversed to have two of the grooves 50 and one of the grooves 51, if desired. In addition, means may be provided for maintaining the spring ring 39'' substantially centered with respect to the inertia ring 40 and against tendency to displace axially relative to the inertia ring. In a desirable form such means comprise radially extending respective spacer rings 52 of suitable diameter and thickness and interposed between the ends of the spring ring 39'' and the axially facing walls within the working chamber 18. These spacer rings may be in viscous shear film coupling spaced or gap relation to both the confronting chamber walls and the confronting end surfaces of the spring ring 39'', thus adding to the viscous damping coupling of the series related inertia mass and tuning spring damper system. To avoid frictional resistance the spacer rings 52 are made from or at least have their exposed surfaces of a non-frictional character, having regard to the damping fluid, the housing wall surfaces and the spring ring, and comprising a suitable plastic such as polytetrafluoroethylene.

Instead of grooves in the working surfaces of the elastomeric spring ring on the order of the grooves 48–51 of FIGURES 4 and 5, the working surfaces may be provided with coupling-gap-maintaining spacer projections as depicted by way of several typical examples in FIGURES 6–12 in which an elastomeric spring ring S has on at least one of its surfaces providing a shear film coupling surface a suitably spaced series of spacer projections 53 (FIGS. 6 and 7) which may be formed integrally in the molding of the ring and project no greater distance from the working surface than the desired shear film coupling gap, and desirably are of slightly less height or thickness than the desired gap relationship with a confronting working surface. As shown, the spacer projections 53 are provided on both of the perimeters of the ring, but may instead, or in addition be provided on one or both of the ends of the ring.

In FIGURE 8 an arrangement is shown wherein the spacers 53' are provided as separate inserts mounted in suitable respective cavities 53a formed in the working surface of the ring S. These inserts 53' may be of a non-frictional material such as polytetrafluoroethylene. While the inserts 53' may be mounted in the recesses 53a and bonded therein after molding of the ring S, mounting of the spacer inserts may be effected during the molding by having the inserts 53' properly located in the mold.

In another form of the spacer means, as shown in FIGURE 9, the ring S may be provided on one or more of its working surfaces with one or more narrow spacer strips 54 extending circumferentially and continuous or discontinuous as preferred. As shown in FIGURE 10 transverse circumferentially spaced strip segments 55 may be applied to one or more of the working surfaces of the ring S. In FIGURE 11 a combination configuration of the spaces of FIGURES 9 and 10 may be in the form of a circumferentially extending continuous or discontinuous strip 57 narrower than the working surface and provided at intervals with lateral spacer arms 58. While the spacers 54, 55 and 57–58 may be molded integrally with the ring S, they may comprise suitably bonded tape pieces such as a polytetrafluoroethylene tape. Whether to employ a molded spacer or an applied spacer of non-frictional material will be dictated by anticipated operating conditions and more particularly whether rubber scrubbing and possible binding may present a problem.

In FIGURE 12 is shown a circumferential section through the elastomeric spring ring S having on its opposite working surfaces anti-friction tape layers 59 which may be merely narrow spacer strips. On the other hand, where desired, as for anticipated serious scrubbing problems due to wide temperature and thus expansion fluctuations, the layers 59 may cover substantially the full width of each or either of the working surfaces.

It will be appreciated, of course, that any of the various elastomeric spring ring configurations may be interchangeably utilized in any of the various embodiments of the invention disclosed as representative, and numerous permutations and modifications of the various forms of the spring rings will suggest themselves to meet numerous operating conditions and requirements or design preferences.

It will be understood that variations and modifications may be effected without departing from the spirit and scope of the novel concepts of this invention.

I claim as my invention:

1. In a tuned vibration damper having means for attaching the same to a structure subject to vibrations to be damped:
    relatively parallelly movable members one of which is an inertial mass and the other of which has said means for attaching to said structure;
    an elastic tuning spring between said members; and
    means coupling said springs and said members in series for tuned damping comprising at least one viscous shear damping film;
    said elastic tuning spring comprising elastomeric material and tuned damping being effective as a function of the elasticity of the material of the spring.

2. A damper according to claim 1, in which said viscous shear damping film is between said inertia mass member and said spring.

3. A damper according to claim 1, in which said viscous shear damping film is between said spring and the other of said members.

4. A damper according to claim 1, in which the coupling means comprise viscous shear damping films between the spring and both of said members.

5. A damper according to claim 4 having a viscous shear damping film area between said spring and one of said members greater than a viscous shear damping film area between said spring and the other of said members.

6. In a torsional vibration damper according to claim 1, the other of said members providing an annular sealed working chamber, the inertia mass member and the elastic tuning spring being ring shaped and concentrically related within said chamber and having confronting peripheral surfaces, at least the principal damper coupling of said inertia mass member with said housing being through said tuning spring.

7. A vibration damper according to claim 6, having viscous shear film coupling between the inertia mass member and the elastic tuning spring and between the elastic tuning spring and a surface defining said chamber.

8. In a vibration damper according to claim 7, the elastic tuning spring having additional axially facing working surfaces in viscous shear film coupled relation to a surface within the working chamber.

9. In a damper according to claim 8, the elastic tuning spring having spacer flanges extending between opposite ends of hte inertia ring member and surfaces within the working chamber.

10. A tuned torsion vibration damper according to claim 1, having the inertia mass member and the elastic tuning spring in the form of ring-shaped members concentrically related with confronting peripheral surfaces, and a second elastic tuning spring of ring form concentrically related to the first mentioned tuning spring, and with the inertia mass member between the tuning springs.

11. In a torsional vibration damper according to claim 1, the other of said members providing a housing defining a working chamber, said inertia mass member and said elastic tuning spring being in the form of respective rings within the housing concentrically related with confronting perimeters, and bearing rings maintaining a predetermined spaced relation of the inertia ring relative to the housing in said chamber.

12. A tuned torsional vibration damper according to claim 1, having the inertia mass member and the elastic tuning spring in the form of respective rings disposed concentrically and with confronting peripheral surfaces.

13. A vibration damper according to claim 1, in which said elastic tuning spring is temperature responsive to expand in the presence of high temperature and to contract in the presence of low temperature, and means to counteract binding in respect to said viscous shear film coupling.

14. In a tuned viscous vibration damper including means for attaching it to a structure subject to vibrations to be damped and the damper having a housing providing a hermetically sealed working chamber containing viscous damping medium, with relatively parallelly movable parts certain of which have confronting parallel working surfaces within said chamber in shear film spaced relation having regard to the viscosity of said damping medium which thereby provides a viscous damping coupling resisting the relative movement of the parts, one of said parts being an inertia mass, the improvement comprising:
another of said parts being an elastomeric tuning spring within said working chamber disposed between and separating said inertia mass and a third part and comprising elastomeric material effecting tuned damping as a function of elasticity of the material of the spring;
said tuning spring and at least one of said inertia mass and said third part having relatively parallelly movably confronting surfaces.

15. In a tuned vibration damper having means for attaching the same to a structure subject to vibrations to be damped:
relatively movable members one of which is an inertia mass;
an elastic tuning spring between said members;
means coupling said spring and said members in series comprising at least one viscous shear damping film;
said elastic tuning spring being temperature responsive to expand in the presence of high temperature and to contract in the presence of low temperature; and
means to counteract binding in respect to said viscous shear film coupling comprising grooves in the surface of said tuning spring.

16. In a tuned vibration damper having means for attaching the same to a structure subject to vibrations to be damped:
realtively movable members one of which is an inertia mass;
an elastic tuning spring between said members;
means coupling said spring and said members in series comprising at least one viscous shear damping film;
said elastic tuning spring being temperature responsive to expand in the presence of high temperature and to contract in the presence of low temperature; and
means to counteract binding in respect to said visous shear film coupling comprising projecting structure on the tuning spring.

References Cited
UNITED STATES PATENTS

| 2,585,382 | 2/1952 | Guernsey | 74—574 |
|---|---|---|---|
| 2,824,467 | 2/1958 | O'Connor | 74—574 |
| 2,834,225 | 5/1958 | Carter et al. | 74—574 |
| 3,049,941 | 8/1962 | Rumsey | 74—574 |
| 3,262,334 | 7/1966 | Edwards | 74—574 |
| 3,264,898 | 8/1966 | O'Connor | 74—574 |
| 3,285,097 | 11/1966 | O'Connor | 74—574 |

OTHER REFERENCES

Floyd, Don E.: Polyamide Resins, 2d ed, New York, Reinhold Publishing Corp., 1966, pp. 100–101.

FRED C. MATTERN, JR., Primary Examiner

F. D. SHOEMAKER, Assistant Examiner